US007013210B2

(12) United States Patent
McBrien et al.

(10) Patent No.: US 7,013,210 B2
(45) Date of Patent: Mar. 14, 2006

(54) VIBRATION MONITORING SYSTEM FOR GAS TURBINE ENGINES

(75) Inventors: Gary M. McBrien, Glastonbury, CT (US); James Gottwald, Amherst, NH (US)

(73) Assignee: Goodrich Pump & Engine Control Systems, Inc., West Hartford, CT (US)

( * ) Notice: Subject to any disclaimer, the term of this patent is extended or adjusted under 35 U.S.C. 154(b) by 143 days.

(21) Appl. No.: 10/801,301

(22) Filed: Mar. 16, 2004

(65) Prior Publication Data

US 2004/0176902 A1    Sep. 9, 2004

Related U.S. Application Data

(63) Continuation of application No. 10/295,528, filed on Nov. 15, 2002, now Pat. No. 6,768,938.

(60) Provisional application No. 60/332,892, filed on Nov. 16, 2001.

(51) Int. Cl.
    *G01H 1/00*    (2006.01)
    *G06F 17/00*    (2006.01)

(52) U.S. Cl. .................... 701/100; 701/29; 701/35; 702/56; 340/439

(58) Field of Classification Search ................ 701/100, 701/29, 35; 340/438, 439, 441; 702/56, 702/34, 182, 183, 185, 189; 73/660, 579, 73/659

See application file for complete search history.

(56) References Cited

U.S. PATENT DOCUMENTS

| | | | |
|---|---|---|---|
| 4,426,641 A * | 1/1984 | Kurihara et al. | 340/683 |
| 4,485,678 A | 12/1984 | Fanuele | 73/660 |
| 5,210,704 A | 5/1993 | Husseiny | 702/34 |
| 5,934,610 A * | 8/1999 | Karolys et al. | 244/53 R |
| 6,208,944 B1 * | 3/2001 | Franke et al. | 702/56 |
| 6,224,341 B1 * | 5/2001 | Fricke | 416/248 |
| 6,289,735 B1 * | 9/2001 | Dister et al. | 73/579 |

FOREIGN PATENT DOCUMENTS

EP    1 148 320 A2    10/2001

OTHER PUBLICATIONS

International Search Report dated Aug. 28, 2003.

* cited by examiner

*Primary Examiner*—Tan Q. Nguyen
(74) *Attorney, Agent, or Firm*—Edwards Angell Palmer & Dodge LLP; David J. Silvia

(57) ABSTRACT

Disclosed is a system and method for monitoring the vibration levels of gas turbine engines. The vibration monitoring system acquires vibration data from an engine, and processes the data with advanced algorithms to determine engine component health, both in a diagnostic and prognostic fashion. The method includes the steps of measuring an operating parameter and a corresponding set of vibration amplitudes for a plurality of rotating component during a period of operation and normalizing the set of measured vibration amplitudes based on established amplitude limits. The set of normalized amplitude data points are stored in parameter-based data blocks, which extend over a predetermined range of the operating parameter. For each data block, a time period remaining to reach the established amplitude limits is estimated based on changes in the normalized amplitude data points stored in the data blocks. An alarm setting is then established based on the estimated time period remaining to reach the established amplitude limits for each data block.

1 Claim, 15 Drawing Sheets

| FIG. 3A | |
|---|---|
| FIG. 3B | FIG. 3C |

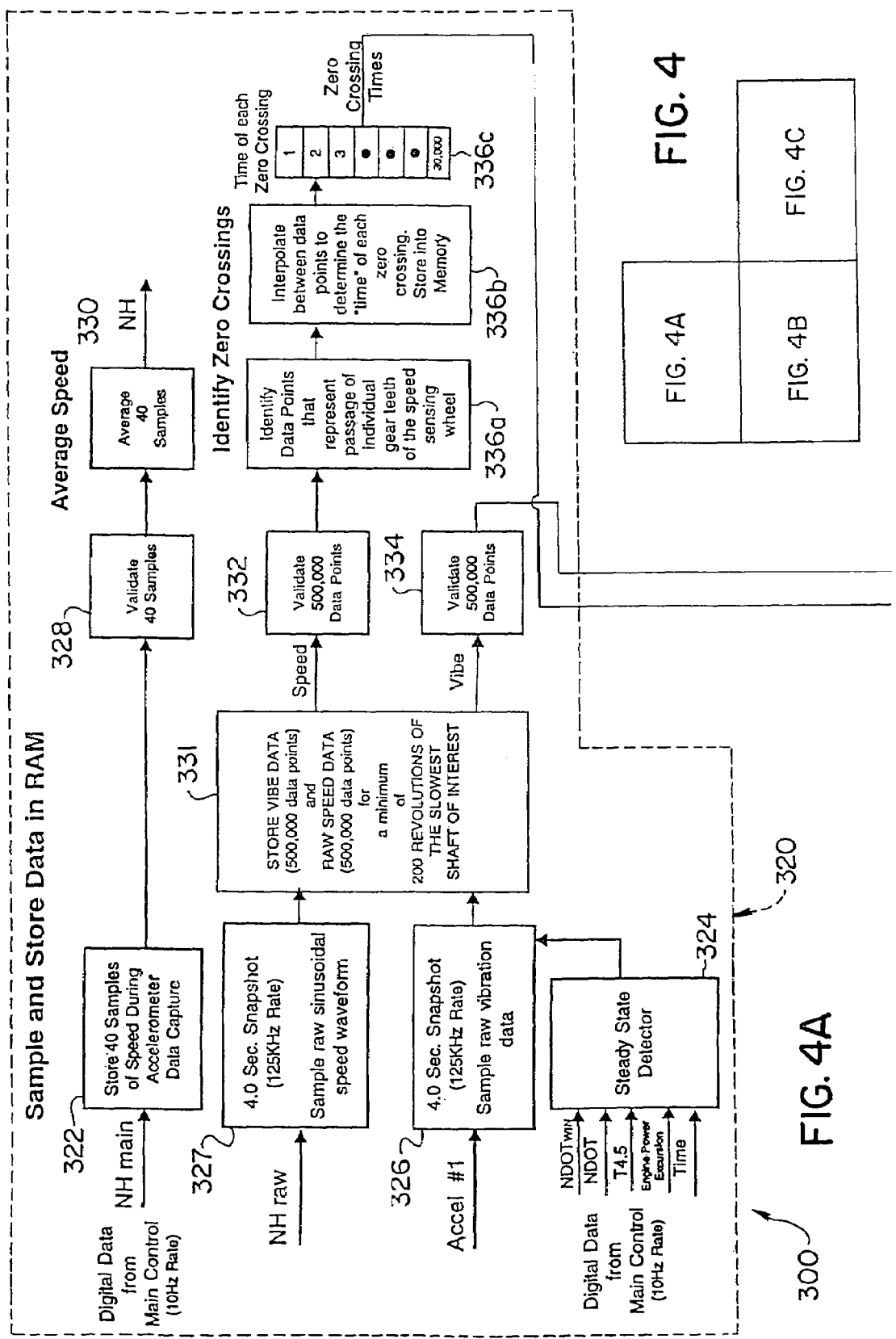

Vibration Monitoring
Engine Gear Diagnostics / Prognostics

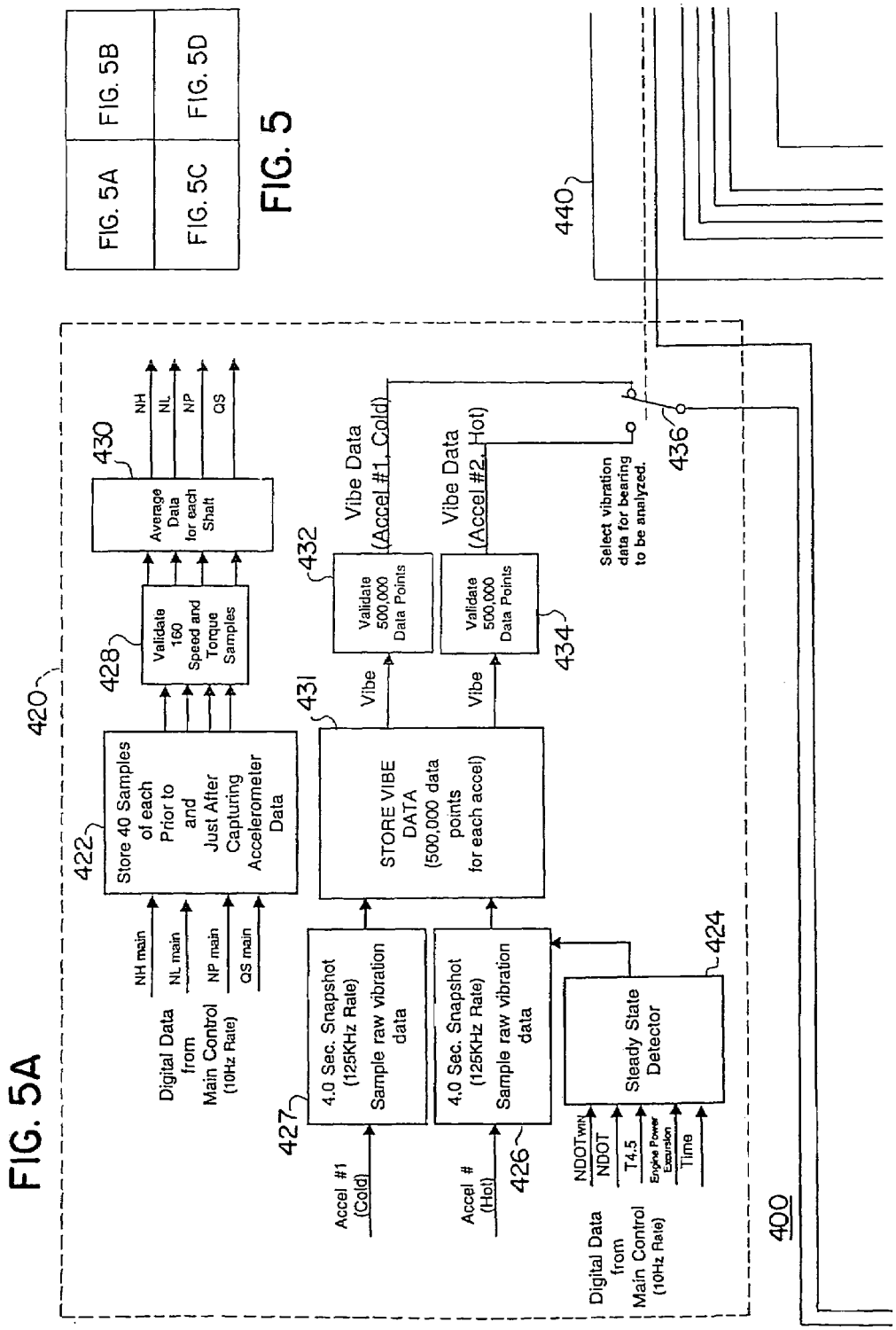

Select Bearing to be Analyzed

| SHAFT | BEARING | ACCEL | PASSING FREQUENCY REL TO INNER RACE $f_i$ (Hz) | PASSING FREQUENCY REL TO OUTER RACE $f_o$ (Hz) | CAGE FREQUENCY $f_c$ (Hz) | BALL/ROLLER SPIN FREQUENCY $f_s$ (Hz) | BANDPASS CENTER FREQUENCY $f_{STRUCT}$ (Hz) |
|---|---|---|---|---|---|---|---|
| HP | #4 | Hot | 4,643 | 3,624 | 226 | 1,854 | TBD |
|  | #5 | Hot | 4,454 | 3,812 | 238 | 3,305 | TBD |
| LP | #2.5 | Cold | 4,239 | 3,561 | 198 | 2,472 | TBD |
|  | #3 | Cold | 4,181 | 3,186 | 187 | 1,396 | TBD |
|  | #6 | Hot | 5,139 | 4,395 | 200 | 2,761 | TBD |
| PT | #1 | Cold | 2,229 | 1,671 | 129 | 764 | TBD |
|  | #2 | Cold | 1,971 | 1,629 | 136 | 1,971 | TBD |
|  | #6.5 | Hot | 3,613 | 2,987 | 136 | 1,569 | TBD |
|  | #7 | Hot | 3,028 | 2,372 | 132 | 1,216 | TBD |
| Accessory Gear Box Shafts | #29 (12 Bearings) #40 | Cold | 3,742 → 100 | 2,015 → 317 | 201 → 40 | 873 → 213 | TBD → TBD |

FIG. 5B

Vibration Monitoring
Engine Bearing Diagnostics / Prognostics

VIBRATION MONITORING SYSTEM FOR GAS TURBINE ENGINES

CROSS REFERENCE TO RELATED APPLICATIONS

This application is a continuation of U.S. patent application Ser. No. 10/295,528, filed Nov. 15, 2002, now U.S. Pat. No. 6,768,938 which claims priority to U.S. Provisional Patent Application Ser. No. 60/332,892, filed Nov. 16, 2001, entitled "Vibration Monitoring System for Gas Turbine Engines," both of which are herein incorporated by reference in thier entirety.

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject disclosure relates to a control system for use with aircraft gas turbine engines, and more particularly to, a control system that includes a real-time vibration monitoring system having a diagnostic and a prognostic component.

2. Background of the Related Art

The gas turbine engine includes several concentrically mounted components, such as shafts, bearings and gears, each rotating at a slightly different and known frequency. Machinery having massive rotating components, such as jet aircraft engines, may experience shaft, bearing, and/or gear failures. In addition, these rotating components may become unbalanced and impose loads upon the bearings and engine housing well beyond acceptable specifications. These problems may be a result of any variety of causes which include, manufacturing defects, design defects, wear, misuse, accidental damages and the like. In the case of in-flight aircraft, failure of these engine components can lead to, not only engine loss, but a catastrophic loss of aircraft and crew.

Vibration amplitudes and patterns, induced by the rotation of jet engine sub-components, can be indicative of sub-component degradation and decreased reliability. Vibration detection is not only an invaluable safety tool used to monitor engines while in operation, but has been incorporated into scheduled engine maintenance procedures. Various techniques have evolved in the art to detect and analyze engine sub-component vibration amplitudes and patterns. For example, U.S. Pat. No. 4,488,240 to Kapadia et al. discloses a vibration monitoring system for gas turbine engines, which includes a non-recursive digital filter network controlled by a data processor. Digital techniques are used to process tachometer signals and general sampling signals at frequencies which are an integral multiple of the component rotating frequency. The output of the digital filter network is a signal used to drive a display device.

Systems such as that disclosed in the Kapadia et al. patent include various hardware and circuitry, for example, micro processors, multiplexers, analog signal conditioning circuitry, analog to digital signal converters, digital filters, digital to analog signal converter of output and a variety of memory chips.

Typically, a vibration analysis system consists of an analysis module which is connected to a generic vibration sensor located at the engine. In addition, the analysis module must access engine specific data for comparison and analysis. The analysis module may be integrally installed in an aircraft for monitoring vibrations during operation. The analysis module may be located in the engine housing or located somewhere else in the aircraft. The design considerations of the location of the analysis module may take into account optimal vibration sampling considerations and space constraints.

A disadvantage of prior art vibration monitoring systems is that they do not include a diagnostic component which is capable of comparing in real-time the measured vibration amplitudes for various shafts, bearings and gears to stored engine specific data. Additionally, prior art systems do not include a prognostic function wherein the time remaining to component failure is predicted based on the measure vibration levels for that component and stored engine specific data.

There is a need therefore, for a control system which includes a vibration monitoring system that has a diagnostic and a prognostic component and is capable of evaluating, in real-time, measured changes in the vibration amplitudes for multiple components.

SUMMARY OF THE INVENTION

The disclosure of the present application relates to a vibration monitoring system for use with a gas turbine engine that includes "real-time" diagnostic and prognostic components. The vibration monitoring system disclosed herein represents one possible configuration of a system which acquires vibration data from an engine, and processes the data with advanced algorithms to determine engine component health, both in a diagnostic and prognostic fashion. Those skilled in the art to which the application appertains would readily appreciate that the system disclosed herein can be used on machinery as well as other types of mechanisms that include rotating components.

The present disclosure is directed to a method for monitoring the vibration levels associated with a rotating component and establishing an alarm setting therefor. The method includes measuring an operating parameter and a corresponding set of vibration amplitudes for a rotating component during a period of operation and normalizing the set of measured vibration amplitudes based on established amplitude limits for the rotating component so as to define a set of normalized amplitude data points. The established amplitude limits are a function of the measured operating parameter for the component. In a preferred embodiment, the measured operating parameter is a frequency of rotation for the component. Alternatively, the measure operating parameter is a rotational torque for the component.

The method further includes storing the set of normalized amplitude data points into parameter-based data blocks, each data block extending over a predetermined range of the operating parameter. For each data block, a time period remaining to reach the established amplitude limits is estimated based on changes in the normalized amplitude data points stored in the data blocks. Based on the estimated time period remaining to reach the established amplitude limits for each data block an alarm setting is established.

In a preferred embodiment, the method further includes ensuring that the measured operating parameter for the component is approximately constant (i.e., steady-state) over a predetermined data collection period prior to measuring the corresponding set of vibration amplitudes. It is presently envisioned that the step of measuring a corresponding set of vibration amplitudes includes conditioning measured vibration accelerations for the component using a Fast Fourier Transform. Those skilled in the art would readily appreciate that other transforms can be used convert data from the time to the frequency domain.

Preferably, the method disclosed herein further includes the step of providing an alarm signal to the operator based on the alarm setting if at least one of the measured vibration amplitudes exceeds an established amplitude limit.

In a representative embodiment, the set of normalized amplitude data points a stored in parameter-based data blocks which extend over a range of about 3% of a rated speed for the component and the data blocks have a spacing of about 1% of the rated speed. Additionally, the set of normalized amplitude data points can be stored in parameter-based data blocks which extend over a range of about 10% of a rated torque for the component and the data blocks have a spacing of about 5% of the rated torque.

Preferably, the normalized set of amplitude data points stored in each of the parameter-based data blocks are interpolated so as to estimate the time remaining to reach the established amplitude limits.

The present disclosure is also directed to a method for monitoring vibration amplitudes associated with a plurality of rotating components and establishing an alarm setting for each component. The method includes measuring an operating parameter and a corresponding set of vibration amplitudes for each of a plurality of rotating components during a period of operation. A rotating component to be monitored is selected from the plurality of rotating components and the corresponding set of vibration amplitudes are conditioned so as to eliminate vibration amplitudes associated with the unselected components in the plurality of components, creating a set of remaining vibration amplitudes.

The set of remaining vibration amplitudes are normalized based on established amplitude limits for the selected component so as to create a set of normalized amplitude data points. The established amplitude limits are a function of the measured operating parameter for the selected rotating component. The set of normalized amplitude data points for each component are stored into associated sets of parameter-based data blocks, each data block extends over a predetermined range of the measured operating parameter.

Still further, the method includes the step of estimating, for each data block, a time period remaining to reach the established amplitude limits based on changes in the normalized amplitude data points stored in the sets of parameter-based data blocks over the period of operation. An alarm setting for the selected component is then established based on the estimated time period remaining to reach the established amplitude limits for each of the data blocks. The method is repeated for each of the plurality of components until an alarm setting is established for each.

The present disclosure is also directed to a system for monitoring vibration levels associated with a plurality of rotating components and establishing an alarm setting for each component. The system includes mechanisms for measuring an operating parameter and a corresponding set of vibration amplitudes for each of a plurality of rotating components during a period of operation. The system further includes a mechanism for selecting from the plurality of rotating components a component to be monitored and a device for conditioning the set of vibration amplitudes so as to eliminate vibration amplitudes corresponding to unselected components in the plurality of components, thereby creating a set of remaining vibration amplitudes. The selected component can be for example, an engine shaft, bearing or gear.

Still further the system includes a mechanism for normalizing the set of remaining vibration amplitudes based on established amplitude limits for the selected component so as to create a set of normalized amplitude data points. The established amplitude limits are a function of the measured operating parameter for the selected rotating component.

In a representative embodiment, a mechanism for storing the set of normalized amplitude data points for each rotating component into associated sets of parameter-based data blocks is included. Additionally, the system includes a device for estimating, for each data block, a time period remaining to reach the established amplitude limits based on changes in the normalized amplitude data point stored in the data blocks over the period of operation and a mechanism for establishing an alarm setting for the selected component based on the estimate time period remaining to reach the established amplitude limits for each of data block.

In a preferred embodiment, the mechanism for measuring a set of vibration amplitudes for a plurality of rotating components during a period of operation includes at least one vibration sensor. In a representative embodiment, at least one sensor is a speed sensor for detecting and signaling frequency of rotation for one of the plurality of rotating components.

It is envisioned that the mechanism for measuring a corresponding set of vibration amplitudes can include means for conditioning measured vibration accelerations for each component using a Fast Fourier Transform.

Preferably, the measured operating parameter is a frequency of rotation for the selected component. Alternatively, the measured operating parameter can be a rotational torque for the selected component.

In a representative system, small accelerometers are used to sense vibration levels or amplitudes and the performance characteristics of these sensors are specifically defined and selected to work in symbiotic fashion with the interface filtering and electronics. Additionally, special signal processing or filtering/conditioning has been designed to match the performance of the accelerometers. This processing extends the frequency range of the accelerometers beyond that normally achieved by similar sensors with conventional filtering. A special combination of filters is used to provide anti-aliasing filtration without degradation of bandwidth.

In the method and system disclosed herein, amplitude trending is used to track growing vibration levels at specific frequencies, and at specific operating conditions. Warning and alarm levels are used to provide thresholds when the pilot is notified of a problem or pending problem. The vibration amplitudes are normalized by dividing them by the alarm level and the resulting data is stored into specific records as a function of speed and operating conditions. Additionally, a method is employed which records vibration amplitudes synchronously with speed data to allow specific extractions of relevant waveforms for use in developing diagnostics and prognostics targeted at individual rotating components.

Special techniques are used to extract bearing tones associated with failure or wear from higher frequency structural resonances. The high frequencies are demodulation and converted to lower frequencies, where the fundamental frequencies are then removed. The remaining tones (residuals) are then examined for signs of growing amplitude over time, an indication of wear.

BRIEF DESCRIPTION OF THE DRAWINGS

So that those having ordinary skill in the art to which the present application appertains will more readily understand how to make and use the same, reference may be had to the drawings wherein:

FIG. 4 is an arrangement of views for FIGS. 4A, 4B and 4C;

FIGS. 4A, 4B and 4C provide a functional block diagram which illustrates a vibration monitoring and diagnostics/prognostics approach for several engine gears;

FIG. 5 is an arrangement of views for FIGS. 5A, 5B, 5C and 5D;

FIGS. 5A, 5B, 5C and 5D provide a functional block diagram which illustrates a vibration monitoring and diagnostics/prognostics approach for several engine bearings;

These and other features of the subject disclosure will become more readily apparent to those having ordinary skill in the art from the following detailed description of preferred embodiments.

DETAILED DESCRIPTION OF PREFERRED EMBODIMENTS

Although the vibration monitoring system described herein below is adapted for use in a rotary wing aircraft engine platform, the inventive aspects of this system can be applied to marine platforms (e.g. boat or ship), land platforms (e.g., automobile or tracked vehicle), or to fixed wing aircraft platforms. Additionally, the vibration monitoring system disclosed herein can be applied to machinery other than engines without departing from the inventive aspects disclosed herein.

Figure 1:
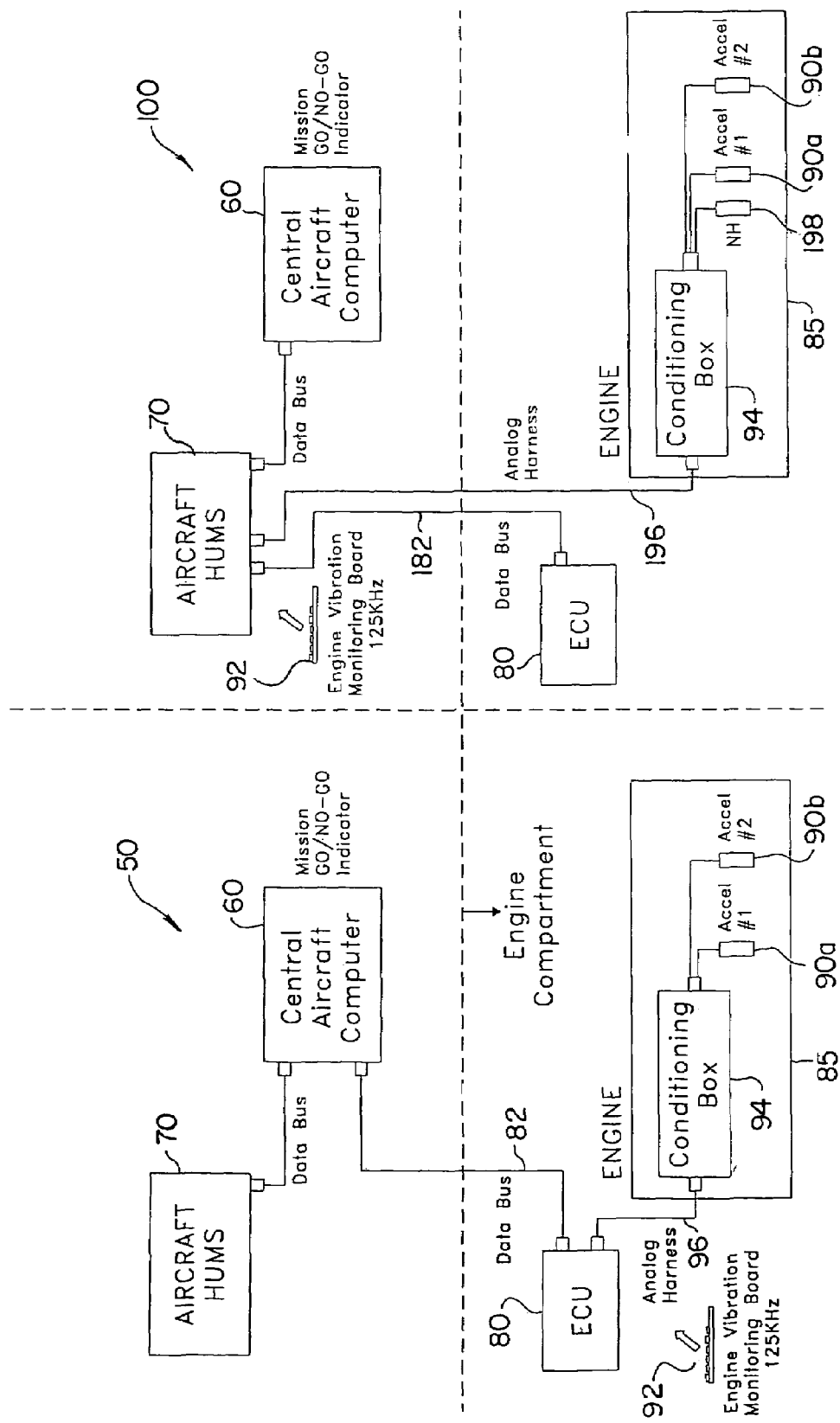
FIG. 1 is schematic representation of two vibration monitoring system architectures, namely a FADEC based system and a HUMS based system.

Referring now to the drawings there is illustrated in FIG. 1, two representative aircraft vibration monitoring system architectures, a Full Authority Digital Engine Control (FADEC) based system and a Heath and Usage Management (HUMS) based system, the systems being designated generally as reference numerals 50 and 150, respectively.

A FADEC system controls the operation of the engine over an entire performance range, usually from engine start to maximum power or thrust. The FADEC system consists generally of an electronic control unit (ECU) 80, a fuel metering unit (i.e. hydromechanical control unit), sensors, actuators, valves, an alternator and interconnecting electrical harnesses. An aircraft HUMS automatically records, analyzes, communicates, and stores information about the operation, condition and usage of each of the aircraft's major assemblies.

As shown in FIG. 1, the components of the FADEC based vibration monitoring system 50 and the HUMS based vibration monitoring system 150 are substantially similar. Each system includes, among other components, an aircraft central computer 60, an aircraft HUMS 70, an engine ECU 80, an engine 85, two accelerometers 90a and 90b, an engine vibration monitoring board 92 and one dual-charge converter or conditioning box 94. The system architectures differ primarily in the interrelationship between the components and the location of the engine vibration monitoring board 92.

In the FADEC based system 50, the ECU 80 communicates through data bus 82 with the aircraft central computer 60. Typically, the ECU will provide to the aircraft central computer information, such as, the status of the engine's electronic components and data obtained from various engine sensors. The aircraft central computer 60 is responsible for the overall control of the aircraft's control surfaces and power plant. Additionally, in the FADEC based system, data signals from the accelerometers 90a and 90b and the conditioning box 94 are provided directly by analog harness 96 to the engine vibration monitoring board 92 which is positioned within the ECU 80.

In the HUMS based system 150, the ECU 80 does not communicate directly with the aircraft central computer 60, but exchanges data with the aircraft HUMS 70 through data bus 182. Data from accelerometers 90a and 90b and conditioning box 94 is provided directly through analog harness 196 to the engine vibration monitoring board 92 which, in contrast to the FADEC based system 50, is positioned with aircraft HUMS 70. Additionally, unlike the FADEC based system 50, the HUMS based system 150 requires a dedicated NH sensor 198 which provides a signal representing the measured gas generator speed (NH) to conditioning box 94.

It should be noted that, from a system architecture standpoint, the location of the engine vibration monitoring board is insignificant. Positioning the engine vibration monitoring board in the ECU 80 is advantageous in that an additional speed pickup (i.e. a NH sensor) is not required and a shorter analog harness is possible depending on the relative location of the ECU 80 and HUMS 70 to the engine 85. Additionally, depending on the bandwidth and memory requirements for the vibration monitoring system, a dedicated high speed processor and board for the vibration monitoring system may not be required.

Figure 2A:
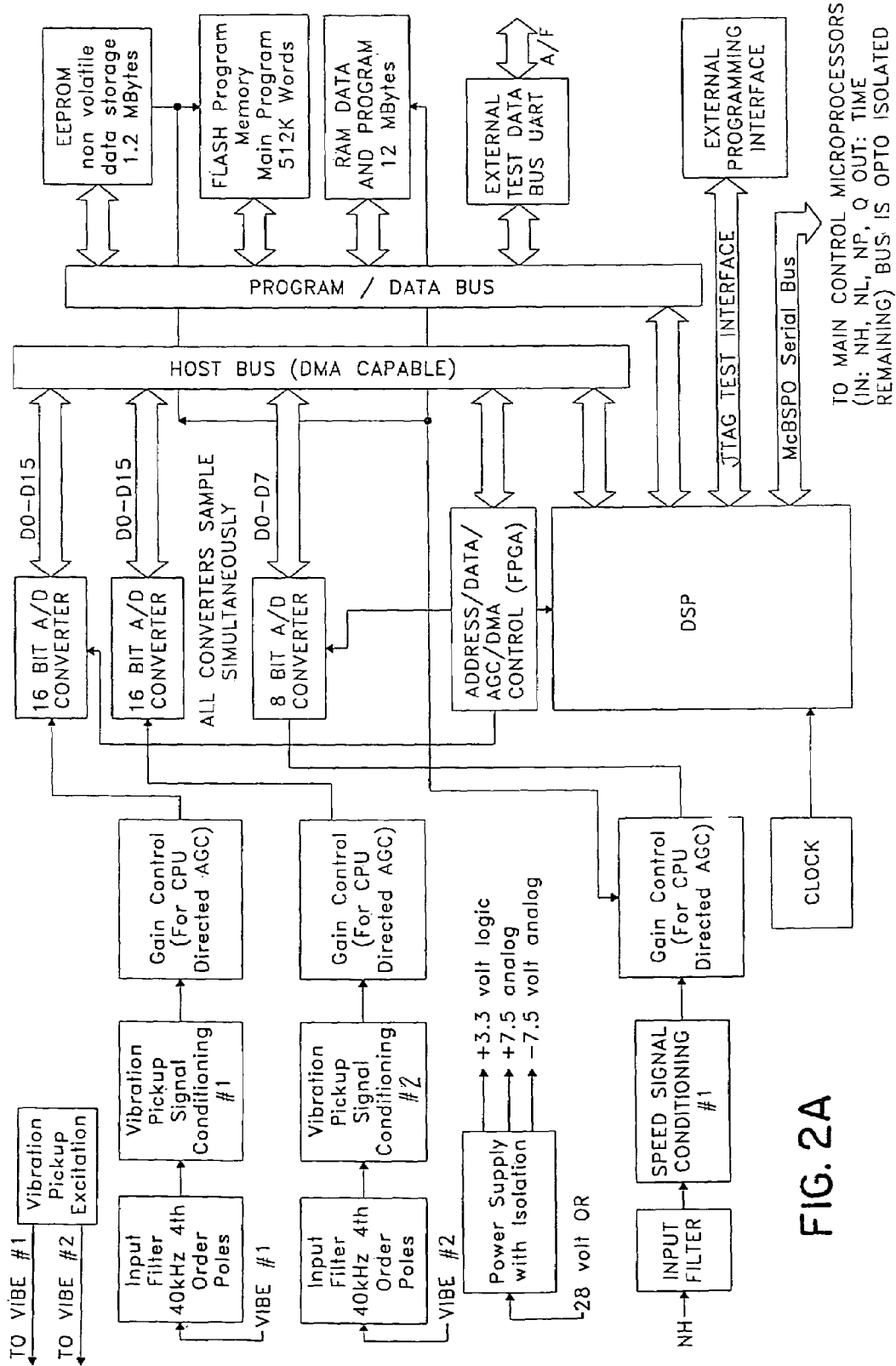
FIG. 2a is a schematic diagram illustrating how the electronic hardware associated with the vibration monitoring system of the subject disclosure interfaces with the engine's Electronic Control Unit (ECU)

FIG. 2a provides an electronic hardware interface diagram for performing engine vibration monitoring, diagnostics and prognostics within the engine's ECU. The digital signal processing board (DSB) or vibration monitoring board (VMB) exists as a stand alone circuit board, independent of other ECU processing. A stand alone VMB is advantageous in that failures within the vibration monitoring system would not influence the rest of the engine control. Additionally, interconnections between the VMB and the ECU would be limited so that the lines can be isolated to prevent propagation of failures or failure effects; and the VMB software can be developed to a lower criticality standard with faster, more efficient software enhancement possibilities.

In both the FADEC based and HUMS based vibration monitoring systems, 50 and 150 respectively, accelerometers 90a and 90b are mechanically connected to the engine 85. The accelerometers 90a and 90b provide an analog signal through analog harness 96/196 which represents the vibrations sensed at the mounting locations.

Those skilled in the art would readily appreciate that features such as the quantity and location of the accelerometers, location of the engine vibration monitoring board, and the intercommunication between the components are representative only and are not intended to limit the scope of the present disclosure.

Figure 2B:
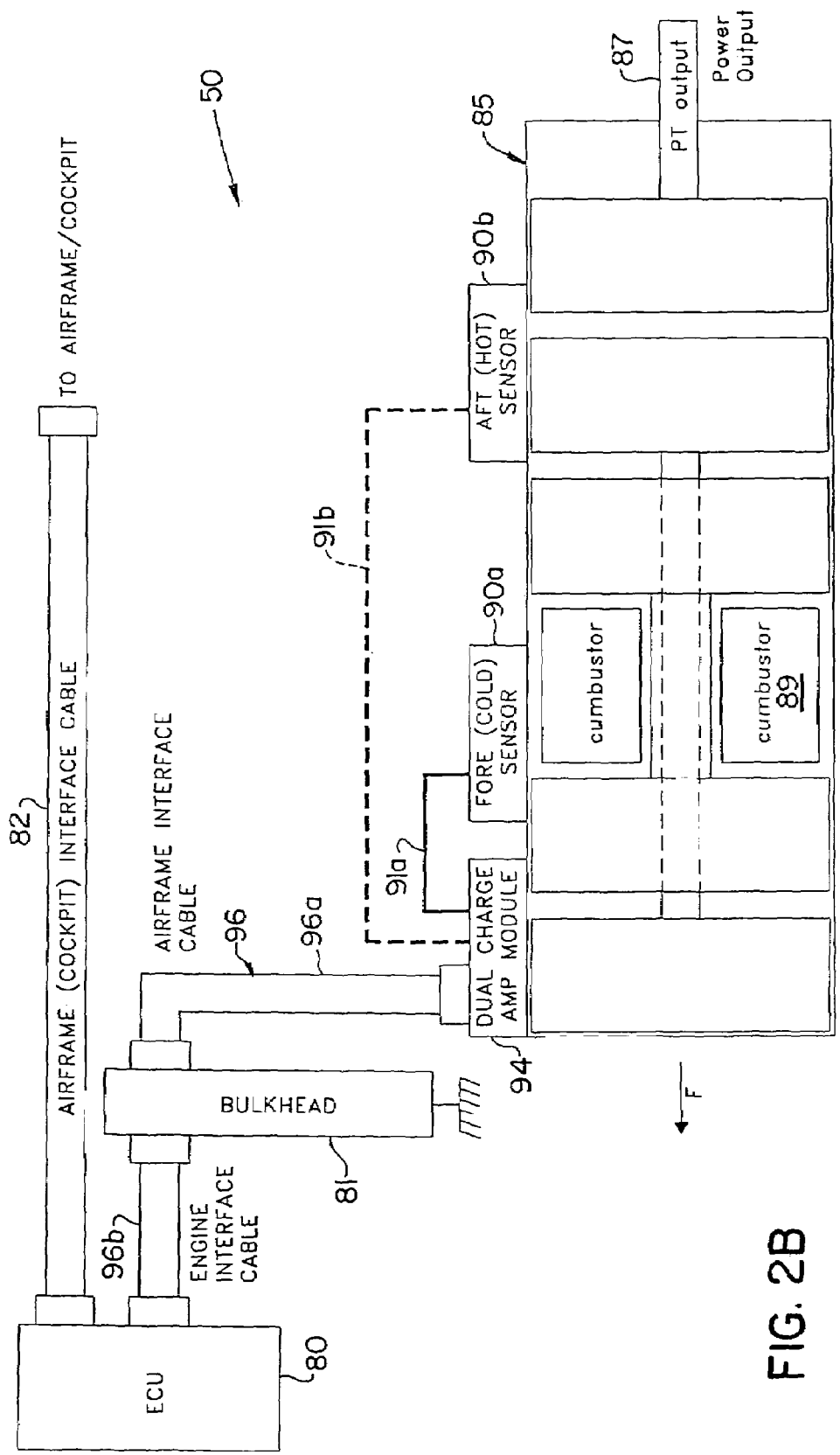
FIG. 2b provides a simplified elevational view of a representative vibration monitoring system of the present disclosure which illustrates a first (cold) accelerometer and a second (hot) accelerometer installed on an engine housing.

FIG. 2b provides a simplified elevation view of FADEC based vibration monitoring system 50. As described with respect to FIG. 1, ECU 80 communicates through data bus 82 with the aircraft central computer (not shown). Additionally, the data from accelerometers 90a and 90b and conditioning box 94 is provided directly by analog harness 96 to the engine vibration monitoring board positioned within the ECU 80. The analog harness 96 includes an airframe interface cable 96a and an engine interface cable 96b which are connected at the airframe bulkhead 81 by a stuffing tube.

The forward end of engine 85 is indicated by directional arrow "F". In the representative embodiment disclosed herein, the conditioning box 94 is positioned on the forward end of the engine. The fore accelerometer (cold) 90a is mounted above the combustor 89 in a relatively cool environment (500 to 600° F.) and communicates with conditioning box 94 through integral cold temperature line 91a. The aft (hot) accelerometer 90b is mounted forward of the power turbine output 87 in a high temperature environment (approximately 1200° F.) and communicates with the conditioning box 94 through integral high temperature line 91b. High temperature line 91b can be mineral filed stainless steel for example.

Due to the extremely hot environment that accelerometer 90b is installed in, there are severe limitations on the material selection for the sensing element, housing, and electrical cable. The sensor element must be, for example, a non-exotic natural crystal. A representative device which is suitable for such an environment is provided by Vibro-meter SA. This sensor has a mechanical resonance of 45 kHz, and is built to withstand 1200° F. or greater. However, the Vibro-meter sensor has an output sensitivity of only 1 pC/g. Due to the low output sensitivity, the conditioning box 94 should preferably be located relatively close to the accelerometer 90b to minimize the stray capacitance effects of the electrical cable. Therefore, a dedicated conditioning box 94 is mounted on the engine housing in close proximity to accelerometer 90b.

The integral high temperature line 91b is preferably a mineral insulated cable which is similar to cables that are used for fire wire and thermocouple connections. Such cables, being mechanically rigid and homogenous, provide a high impedance and a low noise connection medium that is required for the transmission of pC signals from an accelerometer.

Conditioning box 94 adjusts the cold and hot accelerometer 90a and 90b signals and renders the system less sensitive to cable capacitance, which is important for both accelerometers, but particularly for the hot accelerometer 90b, which, as mentioned above, only has an output of 1 pC/g. The voltage signal can then be run to the ECU 80, without special accommodations as would be required if the conditioning box 94 were not used.

Figures 3, 3A:
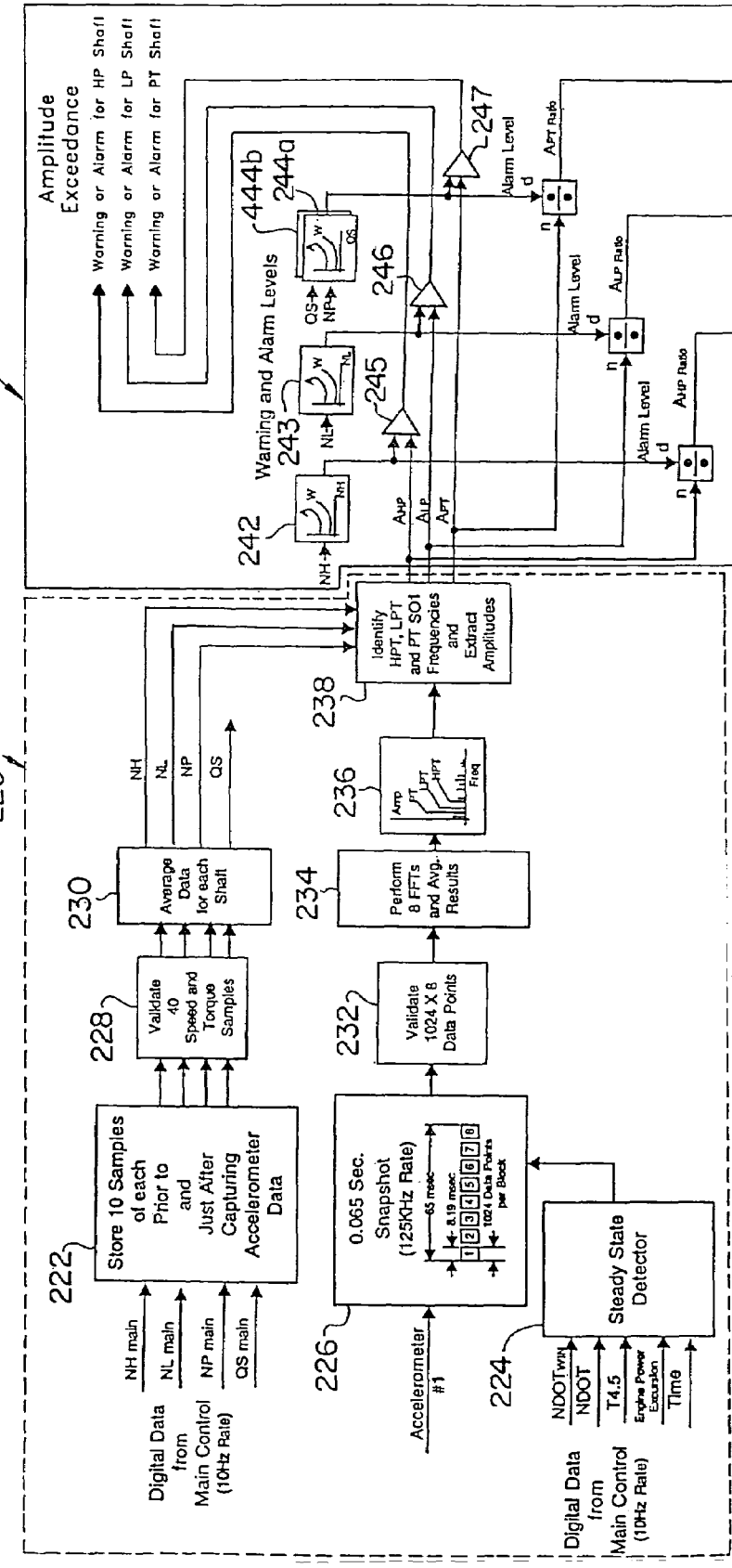
FIG. 3 is an arrangement of views for FIGS. 3A, 3B and 3C.
FIGS. 3A, 3B and 3C provide a functional block diagram which illustrates a method for utilizing accelerometer inputs and digital data from the main engine control unit to determine alarm settings for engine shaft diagnostics/prognostics.
Figure 3B:
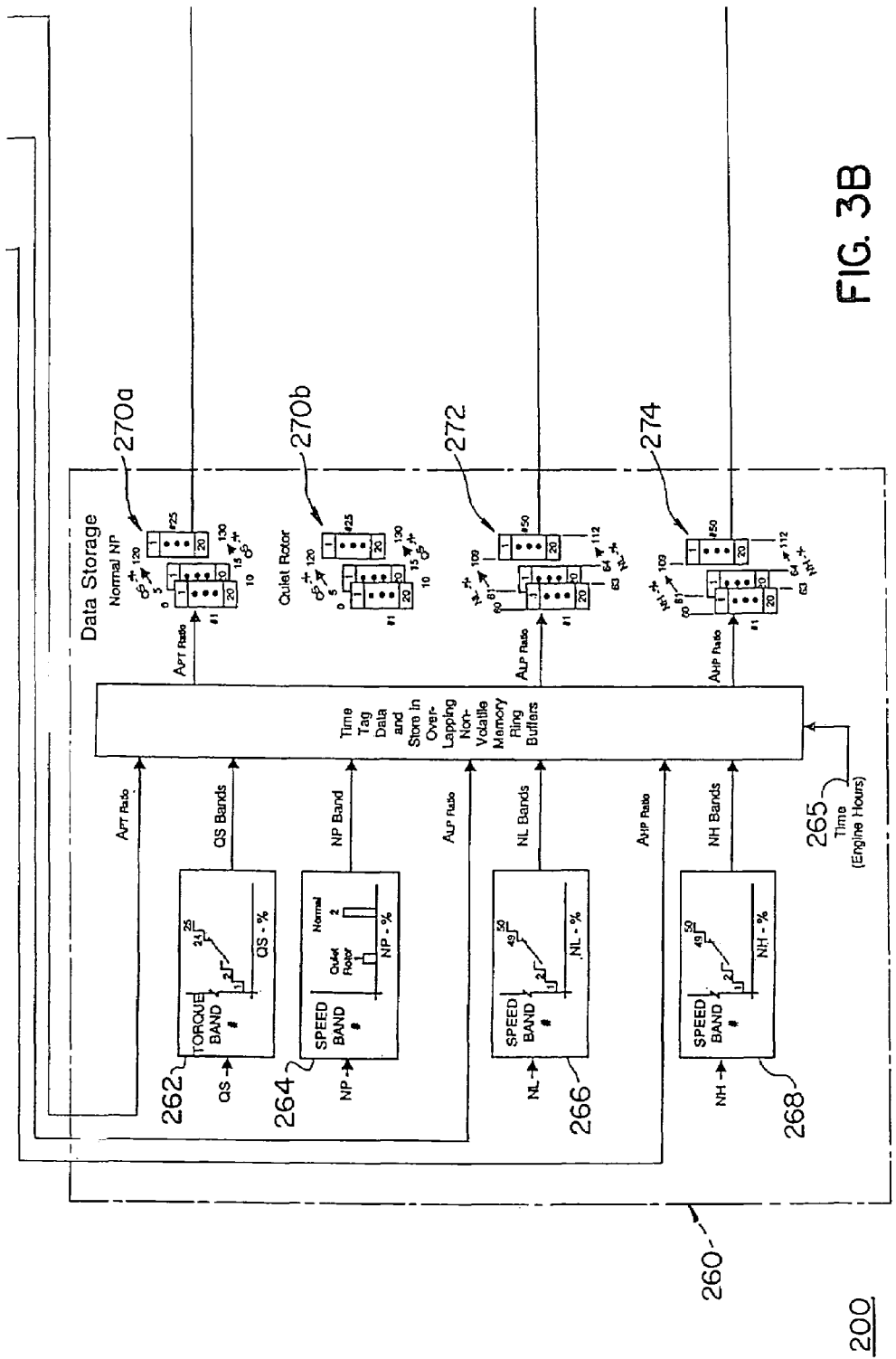
Figure 3C:
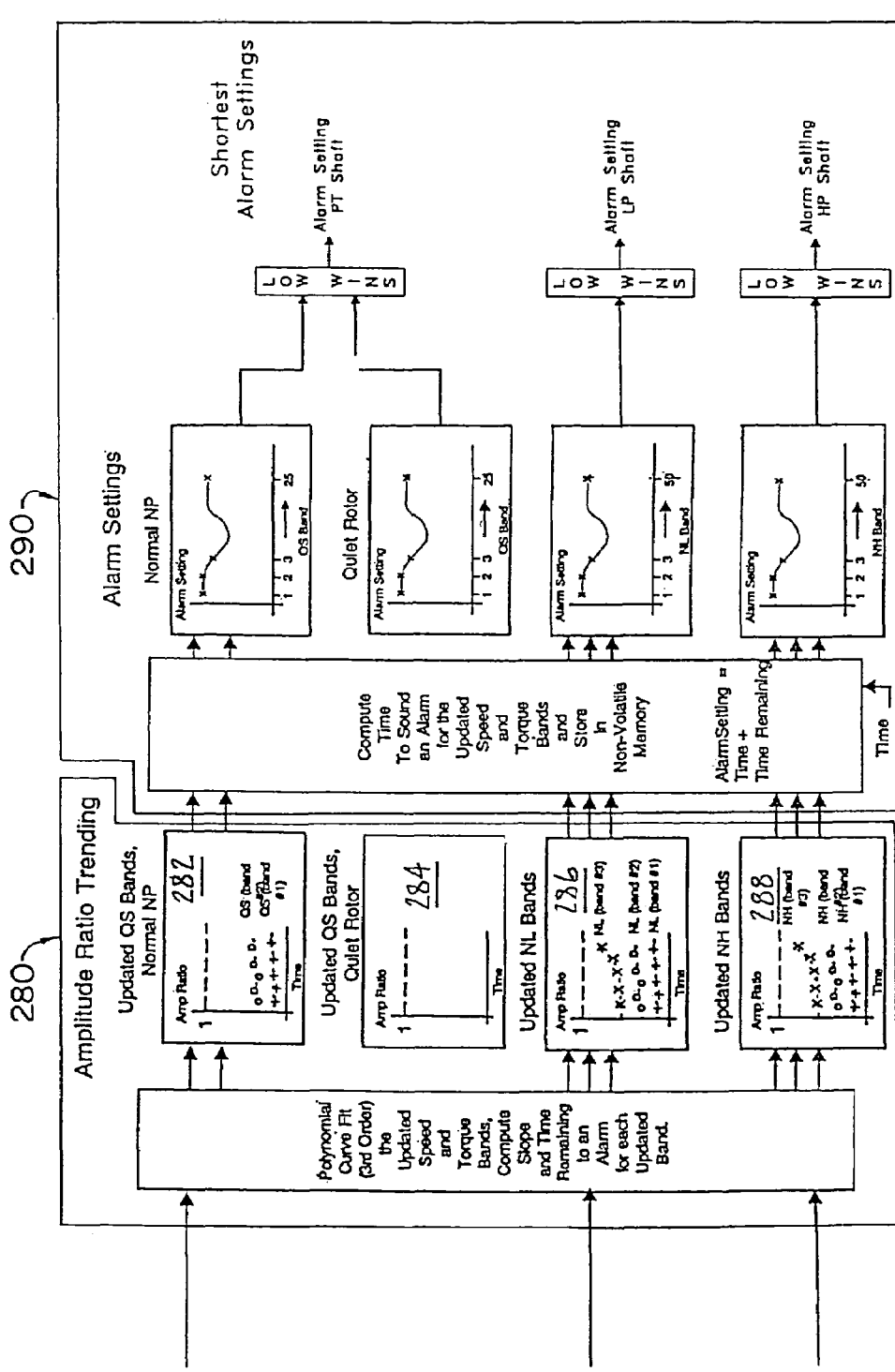

Referring now to FIG. 3, which provides a functional block diagram that schematically illustrates a representative engine shaft vibration monitoring and trending (VMT) system designated generally as reference numeral 200. Engine shaft VMT system 200 includes a data acquisition component 220, an amplitude ratio component 240 for comparing the acquired data to warning and alarm levels, and a data storage segment 260. Shaft VMT system 200 further includes an amplitude trending portion 280 which track the changes in recorded vibration levels and an alarm setting component 290. Engine shaft VMT system 200 measures, through the use of accelerometers mounted on the engine, the vibration levels of the high pressure turbine (HPT) spool or shaft, the low pressure turbine (LPT) shaft and the power turbine (PT) shaft. Based on changes in the amplitude of the measured levels over time, engine shaft VMT 200 predicts the time remaining to an alarm setting (i.e., maximum allowable vibration level) is reached.

In operation, data acquisition component 220 of engine shaft VMT system 200 receives signals from the main engine control (e.g., from ECU 80 of the FADEC based system 50 of FIG. 1) which represent the high pressure turbine shaft speed (NH), the low pressure turbine shaft speed (NL), the power turbine shaft speed (NP), and the engine shaft torque (QS). Ten samples of each speed and torque signal are taken prior to and just after accelerometer data is captured and stored in memory 222. As will be discussed hereinbelow, the accelerometer data is only captured when it is determined that the engine has reached the steady-state condition. The ten speed and torque data samples are then provided to validation circuit 228 which eliminates any abnormalities through range, rate and statistical review of the data. The validated data is used to compute an average NH, NL, NP and QS which are provided as an output from converter 230

In order to determine if the engine has reached steady state, signals representing the rate of change of the gas generator speed (NDOT), the power turbine inlet gas temperature ($T_{4.5}$), engine power excursion, $NDOT_{win}$, and time (t) are provided to the steady state detector 224. $NDOT_{win}$ is based upon engine operating limits related to acceleration, deceleration, torque and temperature. Commonly assigned U.S. patent application Ser. No. 09/963,180, filed Sep. 26, 2001, entitled "Engine Control System," the disclosure of which is herein incorporated by reference, provides a more detailed disclosure of a method for determining $NDOT_{win}$.

If the engine is operating in the steady state condition, for preferably between 1 and 10 seconds based on the magnitude of the power excursion prior to reaching the steady state condition, accelerometer 90a (see FIG. 2) captures a signal which is provided through conditioning box 94 to memory block 226. A 65 msec snapshot of the signal is taken at the 125 kHz rate. The 65 msec signal snapshot is separated into eight blocks of data each containing 1024 data points (125,000 cycles/sec*(0.065 sec/8 blocks)≈1024 cycles or data points). Validation circuit 232 then removes any erroneous data points from the eight blocks of 1024 points before providing the data to Fast Fourier Transform (FFT) processor 234. FFT processor 234 converts the eight data blocks to the frequency domain and results in an output model 236 which provides a measure of the vibration amplitudes over a frequency bandwidth that includes frequencies corresponding to the HPT, LPT and PT.

Using the average data for NH, NL, NP and QS, provided as an output from converter 230, the shaft order one amplitudes for the HPT, LPT and PT are extracted at circuit 238 from model 236. Signals representing these amplitudes, designated as $A_{HPT}$, $A_{LPT}$, $A_{PT}$ in FIG. 3, are provided to the amplitude ratio component 240 of the engine shaft VMT 200.

The amplitude ratio component 240 of the engine shaft VMT 200 compares at logic gates 245, 246 and 247 the amplitude signals for the HPT, LPT and PT to warning and alarm levels established for each by engine shaft models 242, 243, 244a and 244b. Engine shaft models are normally unique to a particular engine design and developed through experimentation and experience by the engine manufacturer. Each engine leaving the factory exhibits a significantly different vibration amplitude due to variations in the structural transmissibility of the engine at the accelerometer mounting location. Therefore, the warning and alarm levels need to be unique to each engine in order to preclude false alarms. At engine acceptance tests, the vibration levels can be recorded by the ECU and warning and alarm threshold levels adjusted accordingly and stored in non-volatile memory to stay with the engine for the duration of its operating life. If an alarm or warning level has been reached or exceeded, a signal representing the appropriate level is provided to the main aircraft computer.

The amplitude ratio component 240 also normalizes the amplitude signals $A_{HPT}$, $A_{LPT}$ and $A_{PT}$ by dividing these signals by the established alarm level. The resulting normalized signals $A_{HPTratio}$, $A_{LPTratio}$ and $A_{PTratio}$ are timed tagged using clock 265 and provided to data storage segment 260 of the engine shaft VMT system 200.

Data storage segment 260 functions to store the continuously collected data immediately into speed bands. By normalizing the amplitude data, i.e., by taking the ratio of the data at any give point to the alarm level for that point, a reading is created that can be stored in adjacent regime "windows" or bands. A single data point is stored in as many as three overlapping speed windows. The purpose of the overlapping windows is to provide the opportunity for the collection of more data within a window without losing the resolution gained by having a fewer number of large windows. In the representative embodiment disclosed herein, the torque windows have been spaced by 5% and the speed windows are spaced by 1%. The width of the torque window is 10% of the rated torque and the width of each speed window is 3% of the rated speed. As a result, every speed amplitude data point would be placed into three adjacent windows and every torque amplitude data point would be placed into at least two and possibly three adjacent windows.

In the embodiment disclosed herein, toque band 262 is broken up into 25 bands ranging from 0 to 130% QS. NP speed band 264 has two bands, a quiet rotor band and a normal rotor band. Depending on the rotor band, $A_{PTratio}$ data is either stored in one of two overlapping non-volatile memory ring buffers or data memory cells 270a or 270b. When the quiet rotor condition exists, the data taken is stored in data memory cell 270a. When the rotor is operating in the normal mode, the data is stored in data memory cell 270b.

Speed bands 266 and 268 are separated into 50 windows which range from 0 to 112% NL and NH, respectively. The $A_{NLratio}$ and $A_{NHratio}$ data for each window is stored in data memory cells 272 and 274. The time tagged and stored data from memory cells 270a, 270b, 272 and 274 is provided to amplitude trending portion 280 of engine shaft VMT system 200. A graphical representation of the data for each updated QS (quiet rotor), QS (normal rotor), NL and NH bands is provided in performance maps 282, 284, 286 and 288, respectively. Amplitude trending portion 280 performs a polynomial curve fit for the data in each of the speed and torque bands and computes the slope of the curve. Based on an extrapolation of the slope of the curve, the intersection of the curve and the alarm level for each speed or torque band is determined. Based on the location of the intersection, the time remaining to an alarm condition for each of the speed or toque bands is approximated.

The time remaining to an alarm condition for each band is provided to the alarm setting component 290 and stored in non-volatile memory. For each band an alarm setting is determined based on the engine clock 265 and the predicted time remaining to alarm condition. The lowest of the alarm settings for the LP shaft, the HP shaft and the PT shaft is then provided as an output from alarm setting component 290.

Figure 4B:
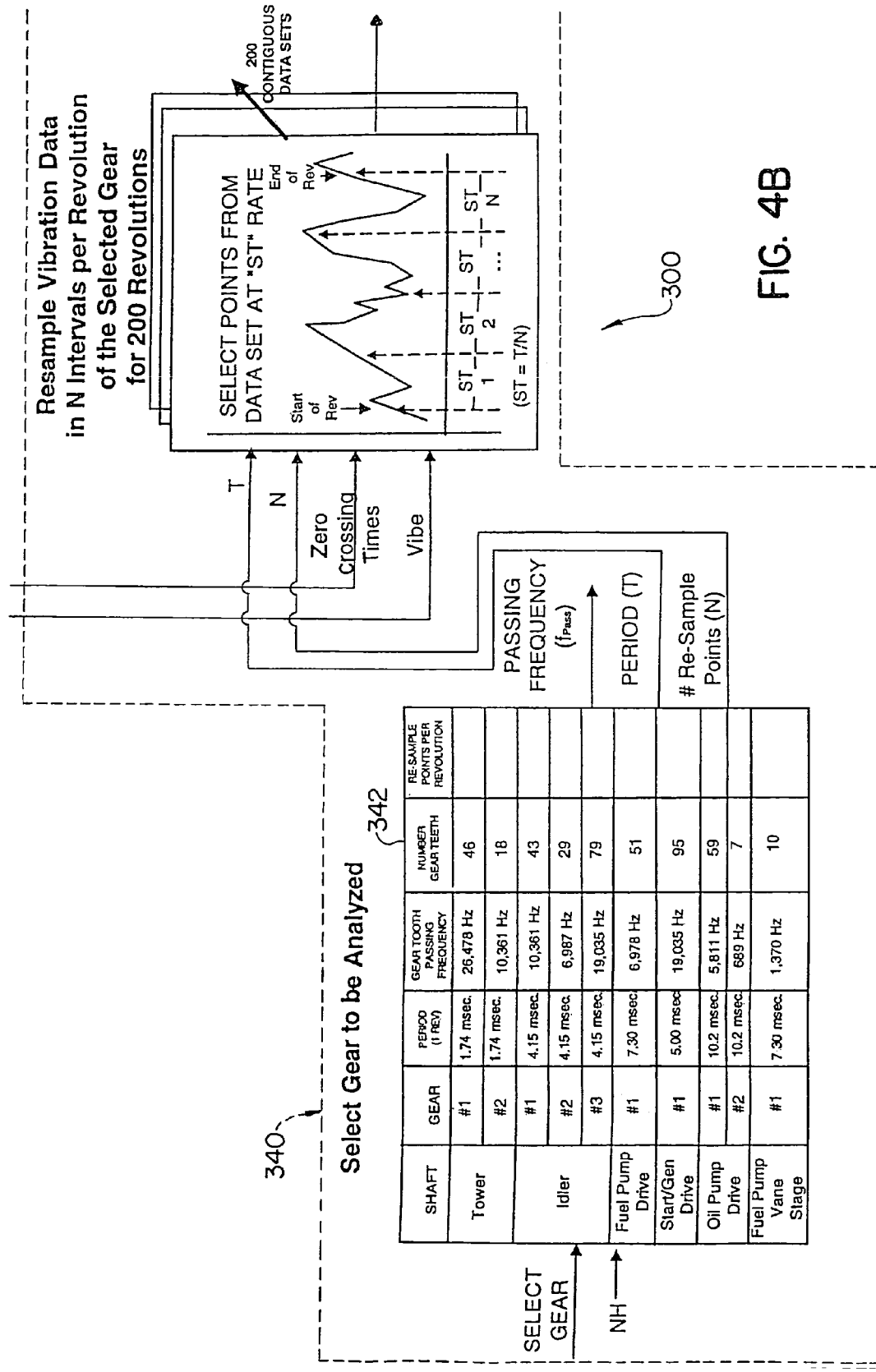
Figure 4C:
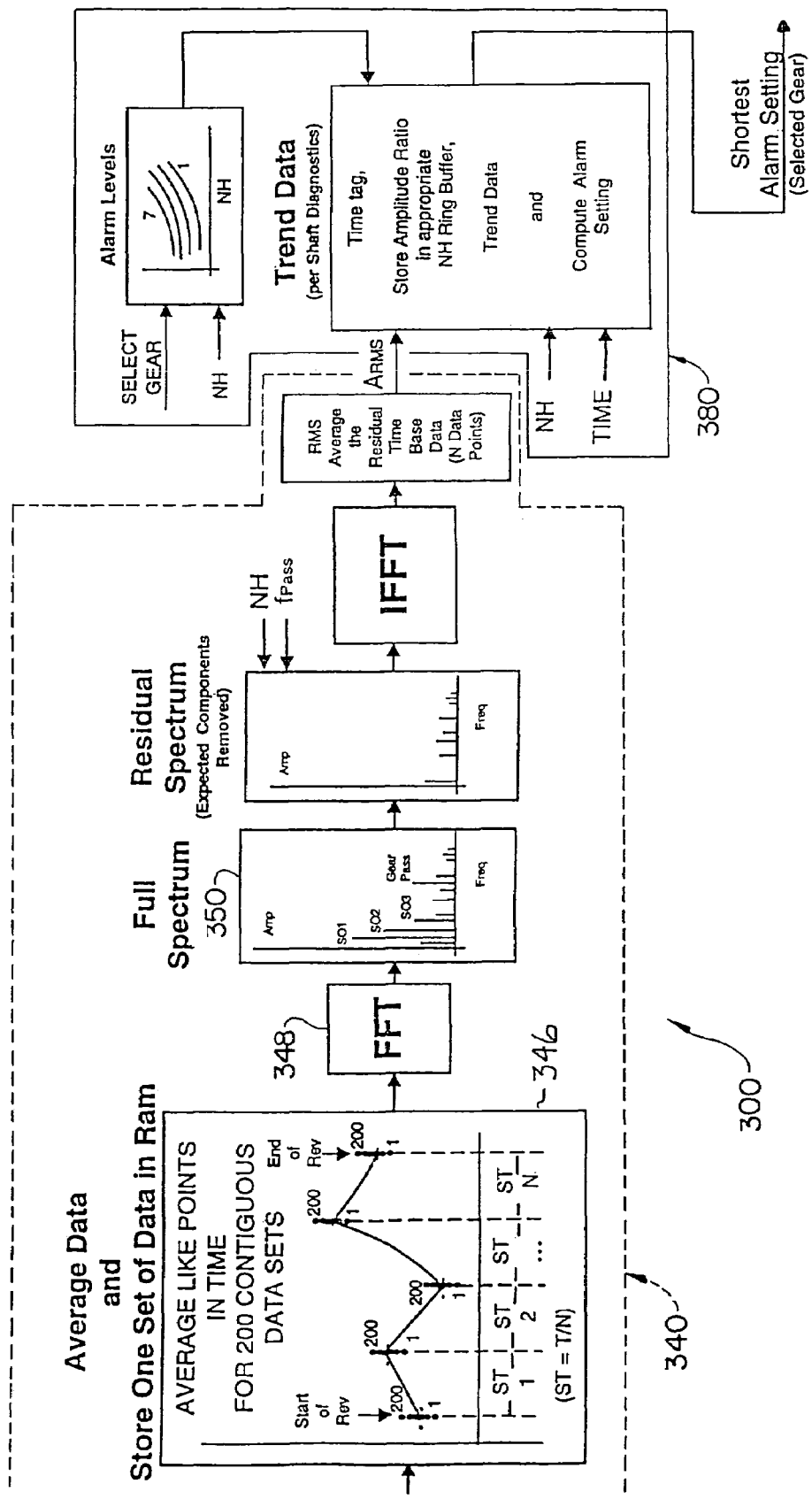

Referring now to FIG. 4, which provides a functional block diagram for a representative engine gear vibration monitoring and trending (VMT) system designated generally as reference numeral 300. Gear VMT system 300 includes a data acquisition and storage component 320, a data conversion component 340 for developing residual spectral responses from the acquired data, and a trending and alarm segment 380 which establishes the shortest alarm setting for the selected gear. Engine gear VMT system 300 measures, through the use of accelerometers mounted on the engine, the vibration levels for several engine gears and predicts based on changes in the vibration levels, the time remaining to an alarm setting is reached. A representative list of gears includes the following:

1 and #2 Tower gear

1–#3 Idler gears

1 Fuel Pump Drive gear

1 Start/Gen Drive gear

1 and #2 Oil Pump Drive gears

1 Fuel Pump Vane Stage gear

Engine gear vibration data is acquired in a manner similar to that described for the engine shaft VMT system 200. In operation, data acquisition component 320 of engine gear VMT system 300 receives a high-pressure turbine shaft speed ($NH_{main}$) signal from the main engine control. Forty (40) speed signal samples are taken while the accelerometer data is captured and stored in random access memory 322. As will be discussed hereinbelow, accelerometer and speed data are only taken when the engine has reached steady state. The forty (40) speed samples are then provided to validation circuit 328 which eliminates any abnormal readings or data by various means such as range, rate and statistical checks. The validated data is used to compute an average NH which is provided as an output from converter 330. The NH shaft drives the accessory gear box and therefore, knowing the shaft speed is essential in determining the gear period (T) and passing frequency ($f_{pass}$).

In order to determine if the engine has reached steady state, data acquisition component 320 receives into steady state detector 324, signals representing the rate of change of the gas generator speed (NDOT), the power turbine inlet gas temperature ($T_{4.5}$), engine power excursion, $NDOT_{win}$, and time. $NDOT_{win}$ is based upon engine operating limits related to acceleration, deceleration, torque and temperature.

If the steady state detector 324 determines that the engine has been in steady state for preferably between 1 and 10 seconds, depending on the magnitude of the power excursion prior to reaching the steady state condition, the accelerometer 90a (see FIG. 1) provides a signal through conditioning box 94 to memory block 326. Additionally, the high-pressure turbine raw sinusoidal speed waveform ($NH_{raw}$) is sensed and provided to circuit 327. Four (4) second snapshots of the accelerometer signal and $NH_{raw}$ taken are at the 125 kHz rate. The four-second snapshot is needed to obtain 200 revolutions of the slowest shaft at 50% power. For example, in gear chart 342, the slowest shafts are the oil pump drive shafts #1 and #2, each having a period (T) of $10.2 \times 10^{-3}$ sec/revolution. Therefore, at 50% power the period is doubled and 200 revolutions are completed in 4.08 seconds.

During the 4 second snapshot, 500,000 samples (125 kHZ*4 seconds=500,000) of $NH_{raw}$ and vibration are taken. The data is then stored in memory 331 and validated by validation circuits 332 and 334. Validation circuits 332 and 334 then remove any erroneous data points from the 500,000 samples before providing the data to circuit 336a by performing range, rate or statistical checks. Circuit 336a identifies the data points that represent passage of individual gear teeth of the speed-sensing wheel. Next circuit 336b interpolates between the data points to determine the time of each zero crossing and stores the results in memory 336c.

Chart 342 provides a representative list of ten (10) engine gears which can be monitored by gear VMT 200. The period (T), gear tooth passing frequency, number of teeth are provided for each gear and stored in non-volatile memory. The data for the period and passing frequency is representative of 100% rated speed. The number of re-sample points per revolution is determined based on the 125 KHz sampling rate and the period for the selected gear. The average speed NH is determined by data acquisition component 320 and is used to adjust the period and passing frequency based on the percentage of rated speed.

The first gear of interest is selected and the passing frequency ($f_{pass}$) and the period (T) are provided as an output from chart 342. A resample or selection rate is determined by dividing T into an even number of increments, usually 256. The data is first grouped into data sets for each of the 200 revolutions. Data is then selected from the raw data set starting at the speed signal zero crossing at the start of the interval, continuing at ST intervals and terminating at the period T. This process is repeated, collecting a set of data points for each consecutive window of width ST. A minimum of 200 data sets will be gathered, each synchronized to a complete revolution of the gear of interest. A representation of the 200 data sets is illustrated in data chart 344.

The 200 data sets are then averaged, like point with like point, effectively overlaying the waveforms one on top of another and averaging, as shown in data graph 346. Signals that do not exhibit the periodicity of interest appear as largely random excursions at each point, and therefore sum to zero, whereas the periodic values add and average to a specific value.

This filtered data is then processed with an FFT 348 to derive a spectral response 350. Since there are known spectral components which do not correlate to impending defects such as shaft speed, gear pass frequency and higher harmonies, these "expected" components are removed from the spectral envelope to yield what is called the "residual spectrum" 352, or remaining frequencies that correspond to potential problems. A inverse FFT is performed and the residual spectrum 353 and the amplitudes of the residual components are RMS averaged to yield a single amplitude $A_{RMS}$. This amplitude, $A_{RMS}$, is time tagged (in terms of engine hours), stored in a non-volatile memory ring buffer as a function of speed, trended as a function of time, and the slope of the trend line compared to an alarm level to compute a time remaining prognostic indicator. This process is repeated for each gear for a total of 10 separate indicators that are trended in a manner similar to that described in FIG. 3.

Amplitude trending circuit 380 determines the shortest alarm setting for the selected gear in a similar manner to that performed by amplitude trending portion 280 of the engine shaft VMS. Amplitude trending circuit 380 performs a polynomial curve fit for the data taken at each point overtime and estimates the slope of the curve. Based on the slope of the curve, the time remaining to an alarm condition for each of the gears is predicted.

The time remaining to an alarm condition for each gear is stored in non-volatile memory. For each gear an alarm setting is determined based on the engine clock 265 and the predicted time remaining to alarm condition. The lowest of the alarm setting for each gear is then provided as an output from alarm setting component 380 to auctioning circuit 510 (see FIG. 6).

This technique yields a robust evaluation of gear integrity, that is, the residual RMS amplitude tends to change dramatically when there is a problem. Therefore setting an alarm level should be insensitive to engine to engine variations in vibration transmissibility.

Figure 5C:
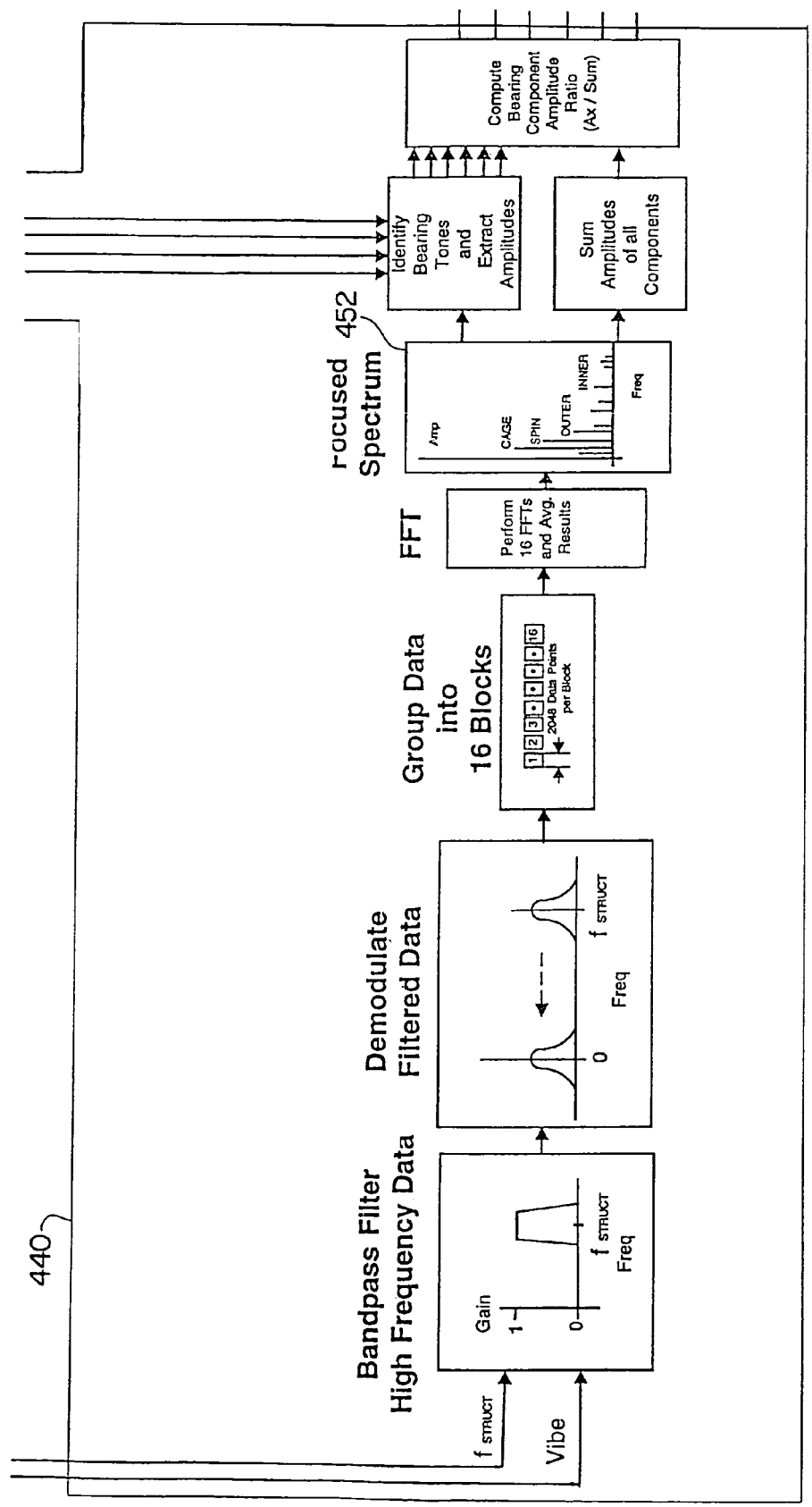
Figure 5D:
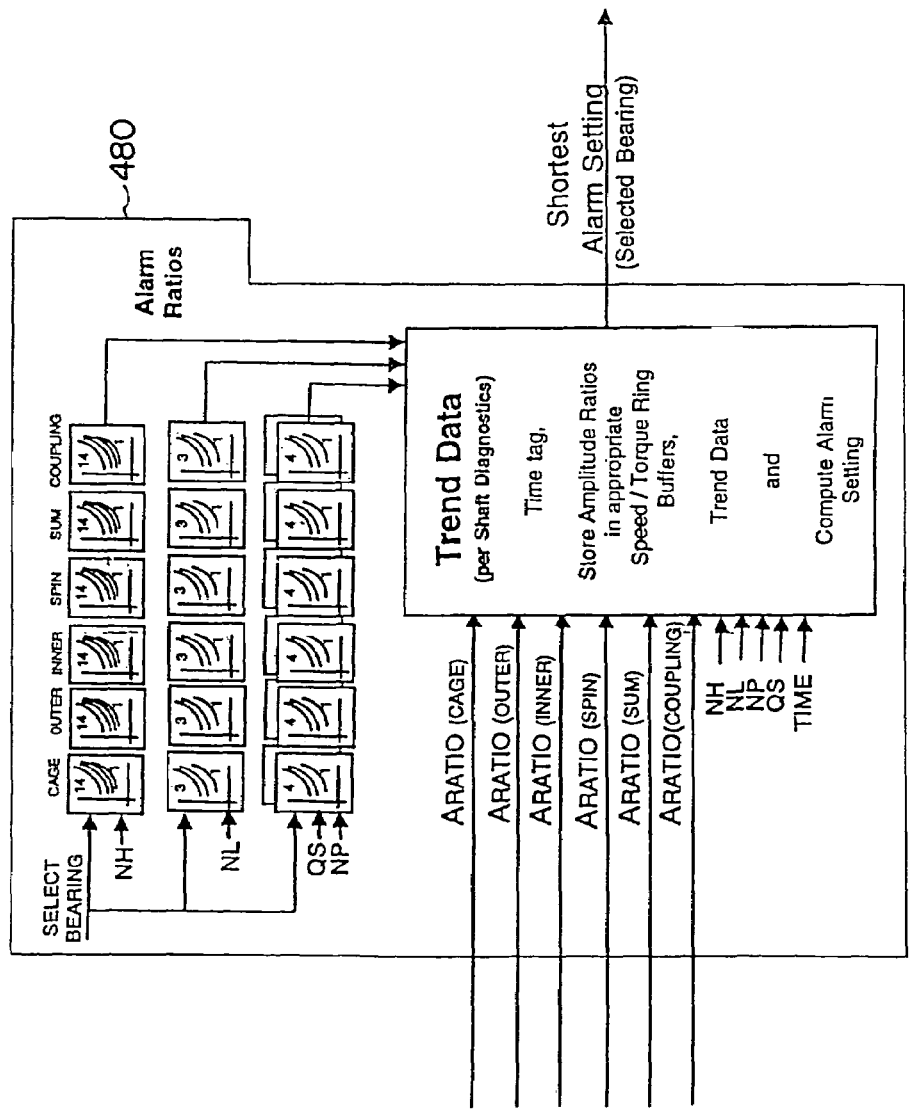

Referring now to FIG. 5, which provides a functional block diagram for a representative engine bearing vibration monitoring and trending (VMT) system designated generally as reference numeral 400. Similar to the gear VMT 300, bearing VMT system 400 includes a data acquisition and storage component 420, a data conversion component 440 that filters the acquired data and creates a spectral response therefrom, and a trending and alarm segment 480 which estimates the shortest alarm setting for each bearing.

Engine bearing VMT system 400 measures, through the use of accelerometers mounted on the engine, the vibration levels for several engine bearings and predicts based on changes in the vibration levels, the time remaining to an alarm setting is reached. A representative list of bearings is included in chart 442.

Bearings are inherently more difficult to monitor than rotating shaft or gears because they are not only quieter during normal operation, but when degraded. The quiet or low amplitudes are not only difficult to sense, but they also tend to be masked by the higher amplitudes of the other components. Innovative techniques must be used to extract these signals from the overall spectrum. To this end, a technique is used whereby higher order harmonic bearing frequencies, typically the fifth, are extracted from structural resonances that are excited by these higher order harmonics. The structural resonances provide a means by which the bearing vibrations are amplified and therefore can be "heard" by the vibration sensor.

FIG. 5 provides a functional block diagram of an engine bearing VMT system which is designated as reference numeral 400. In the representative embodiment disclosed herein, the bearings are located throughout the engine and therefore, data is obtained from either the fore or the aft accelerometer depending on which bearing is being evaluated. Engine bearing vibration data is acquired in a similar manner to that described for the engine shaft VMT system 200.

In operation, data acquisition component 420 receives several speed and torque signals from the main engine control. Forty (40) samples are taken while the accelerometer data is captured and stored in random access memory 422. Provided the engine is in the steady state condition, as indicated by steady state detector 424, an extensive set of raw vibration data is captured at a 125 Khz sample rate over 4 seconds. This represents 500,000 data points. The three shaft speeds, namely NH, NP, and NL, are also sampled over the 4 second period and the average speed for each shaft is stored in memory 430. The raw vibration data is time tagged and stored in memory 432 and 434 for post processing.

Chart 442 indicates which shaft drives a particular bearing as well as which accelerometer, hot 90b or cold 90a, detects the structure borne noise from the selected bearing. For example, the HP shaft drives the #4 bearing and vibrations associated with this bearing are detected by the hot accelerometer 90b. Therefore, the position of switch 436 is based on the selected bearing to be monitored and determines which accelerometer provides a data signal to trending and alarm segment 480.

Every data point is validated by various means such as range, rate and statistical checks. The raw data for the selected accelerometer is filtered, "demodulated", and grouped into sixteen data blocks 448. Demodulation can be described simply as extracting an amplitude modulated audio signal from a high frequency carrier, yielding a lower frequency signal of interest. In this case the audio signal is the bearing tone and the high frequency carrier is an engine structural resonance that is responding to $5^{th}$ order harmonics of the bearing tone.

An FFT 450 is then taken of the demodulated signal to derive spectral response 452. Since each bearing has its own particular geometry with regard to the number and size of the balls, and the inner and outer race sizes, the resulting characteristic frequencies for each bearing are stored in memory and referred to as the bearing database. This database, shown in chart 442, is used to extract the four characteristic frequencies for each bearing, namely the inner race passing frequency (fi), the outer race passing frequency (fo), the cage frequency (fc), and the roller/ball spin frequency (fs), from the frequency spectrum. The amplitude of each of these bearing tones, the RMS averaged sum of the four amplitudes and cross coupling measure are trended as described previously to compute a time remaining prognostic indicator. This process is repeated for each bearing for a total of 21×6=126 indicators that potentially need to be trended for the representaive engine.

NH, NL, NP, QS and time (t) are provided to amplitude trending circuit 480 which determines the shortest alarm setting for the selected bearing in a similar manner to that performed by amplitude trending portion 280 of the engine shaft VMS. Amplitude trending circuit 480 performs a polynomial curve fit for the data taken at each point overtime and estimates the slope of the curve. Based on the slope of the curve and an extrapolation of the data points, the time remaining to an alarm condition for each of the speed or toque bands is predicted.

For each bearing an alarm setting is determined based on the engine clock and the predicted time remaining to alarm condition. The lowest of the alarm settings for each bearing is then provided as an output from alarm setting component 480 to auctioning circuit 510 (FIG. 6).

This technique yields a robust evaluation of bearing integrity, that is, the bearing tone amplitudes tends to change dramatically when there is a problem. Therefore setting an alarm level should be insensitive to engine to engine variations in vibration transmissibility.

Figure 6:
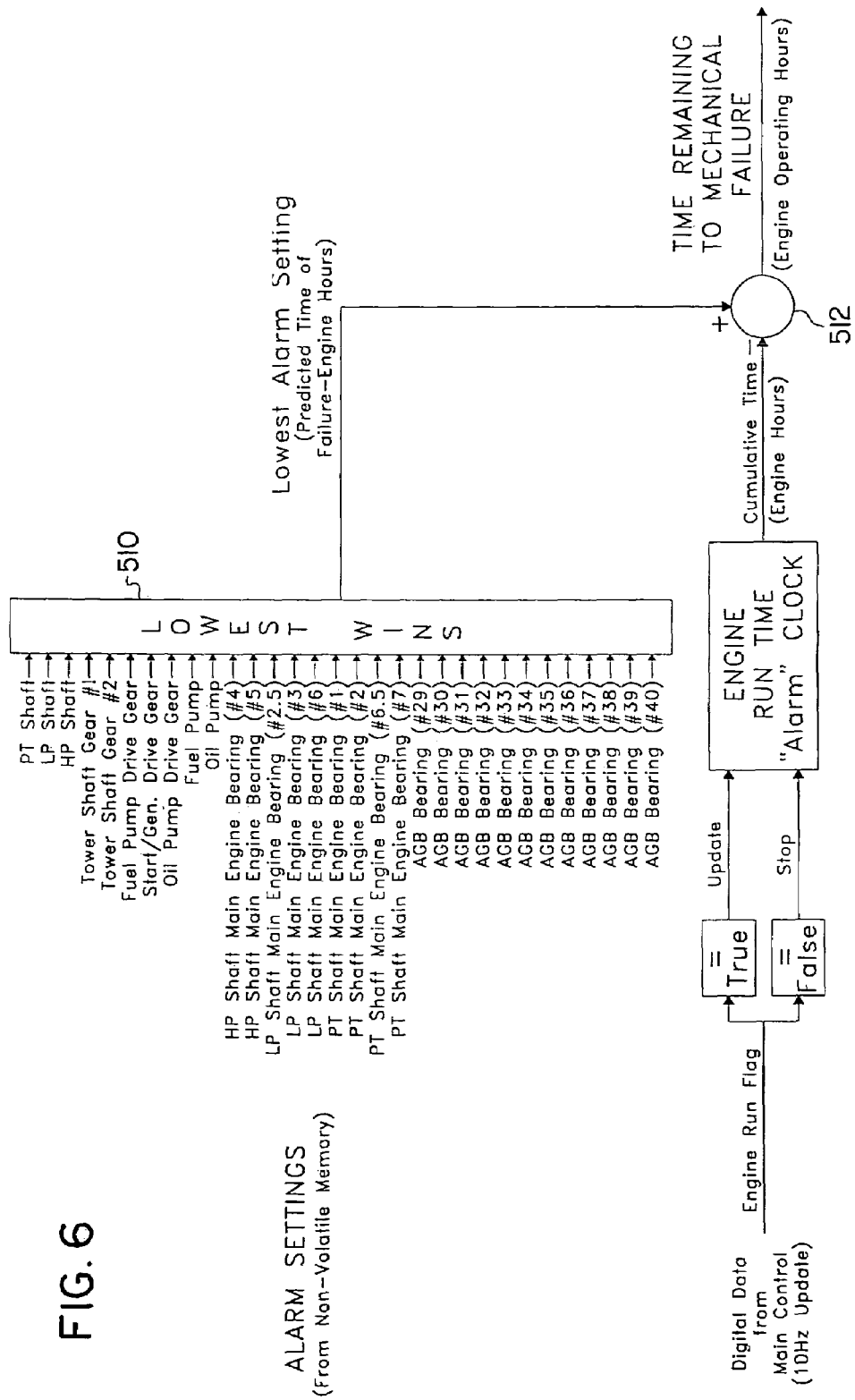
FIG. 6 is a logic diagram illustrating a method for estimating a time remaining to mechanical failure based on alarm settings established for several engine rotating components.

Referring now to FIG. 6 which provides a functional block diagram that represents a representative method for estimating the time remaining to mechanical failure for the aircraft engine. The shortest alarm settings determined by the engine shaft VMT system 200, gear VMT system 300 and bearing VMT system 400 are provided to auctioning circuit 510. The lowest alarm setting is provided as an output from the auctioning circuit 510 to summing junction 512.

If the engine is running, the clock 514 is updated every second and track the cumulative amount of the engine has been operating and stores this time in non-volatile memory every minute. At summing junction 512 the cumulative operational time is subtracted from the lowest alarm setting and the time remaining to mechanical failure is determined in engine operating hours. A signal representing the time remaining to mechanical failure can be used to drive a data display which assists the pilot or maintenance crew determining when maintenance should be scheduled.

Figure 7:
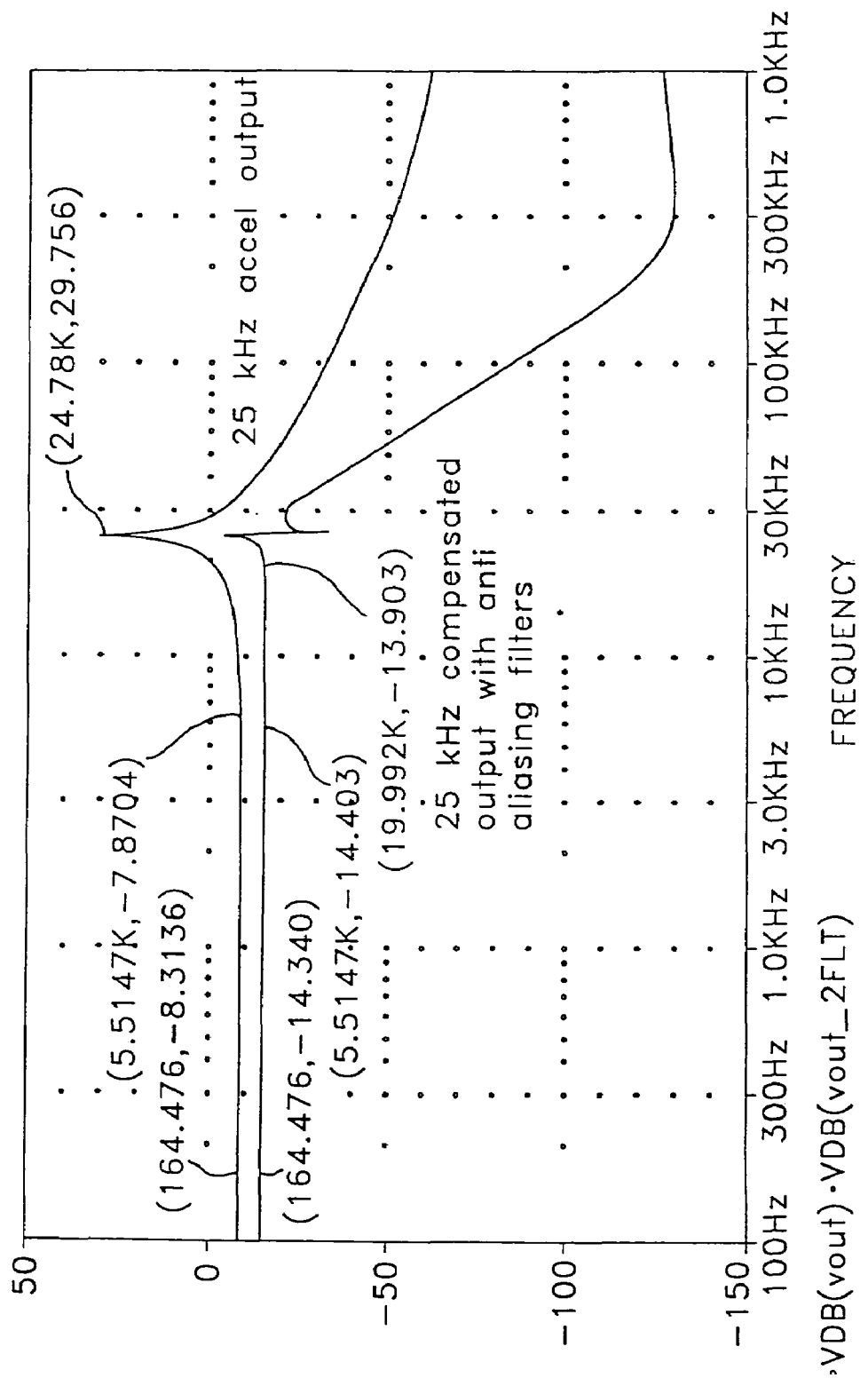
FIG. 7 provides a graphical representation of the response curve for the compensated accelerometer frequency signal.

Referring now to FIG. 7 which provides a graphical representation of a response curve for the compensated accelerometer frequency signal. Given the potential higher rotational speeds of the engine components the accelerometers need to exhibit a minimum bandwidth of 37 kHz (based on a definition of bandwidth as flat to within +/−5%). This bandwidth is beyond the capability of many accelerometers, but a technique for frequency compensation has been developed that will produce this capability using an accelerometer that has a mechanical resonance of only 45 kHz. This will allow detection of the highest frequencies of interest. In the embodiment disclosed herein these represent failures of a gear tooth in the tower shaft driving the accessory gear box, and failures in bearings that excite the 5th harmonic of bearing frequency. The 5'" harmonic is important, because a technique is used to separate the relatively low energy bearing frequency amplitudes from the more dominant shaft and gear frequency amplitudes in the engine.

The response curve for the compensated signal is shown in FIG. 7. The compensation network also includes dual two pole filters for anti aliasing (for a total of four poles), first a Butterworth, then a Chebyshev. The compensation network and the two filters are designed to work together to give the desired flatness in the resulting output. The curves in this graph show the response for both the accelerometer sensing element alone, and also for the compensated signal with anti aliasing filters. This example is based on the compensation of an accelerometer that exhibits a 25 kHz resonance, but the results will scale to any circuit it is used on. The basic curve shows that an error in the baseline curve of +0.4 dB (or +5%) occurs at a frequency of 5.5 kHz, only 22% of the way to the mechanical resonance of 25 kHz. The compensated signal however, is flat to within the same +0.4 dB at 20 kHz, which is 80% of the resonance frequency. As mentioned, the concept can be scaled to any frequency, so that for a 45 kHz mechanical resonance, the response can be made flat to 36 kHz (+4%), with +7% error at 37 kHz.

Tolerance studies performed using Monte Carlo analysis show that given reasonable component to component variations for both the conditioning circuitry and the accelerometers, the desired response curve will be achieved. This compensation network and filtering can be easily added to the amplifier within the charge converter module.

While the invention has been described with respect to preferred embodiments, those skilled in the art will readily appreciate that various changes and/or modifications can be made to the invention with departing from the spirit or scope of the invention as defined by the appended claims.

What is claimed is:

1. A method for monitoring bearing vibration levels associated with a rotating component and establishing an alarm setting therefor, the method comprising the steps of:
   a) measuring an operating parameter and a corresponding set of vibration amplitudes for a rotating component during a period of operation, the rotating component including a plurality of bearings and at least one sensor for measuring vibration amplitudes;
   b) selecting a bearing to be monitored from the plurality of bearings of the rotating component;
   c) selecting the vibration sensor to be used for monitoring the vibration amplitudes of the selected bearing;
   d) demodulate the set of measured vibration amplitudes monitored by the sensor;
   e) convert the demodulated set of measured vibration amplitudes into spectral data;
   f) compare the spectral data to predetermined tonal frequencies for the bearing so as to define a set of normalized amplitude data points; and
   g) trend the normalized amplitude data points over the period of operation so as to establish a time period remaining to reach an established amplitude limit.

* * * * *